Aug. 18, 1970    P. F. KURER    3,524,255
METHOD OF ATTACHING A TOOTH CROWN TO A TOOTH ROOT
Filed April 11, 1969

INVENTOR: PETER FRANK KURER
BY Louis Orenbuch ATTORNEY

United States Patent Office
3,524,255
Patented Aug. 18, 1970

3,524,255
METHOD OF ATTACHING A TOOTH CROWN TO A TOOTH ROOT
Peter Frank Kurer, Speakers House, 39 Deansgate, Manchester, Lancashire, England
Continuation-in-part of application Ser. No. 583,203, Sept. 30, 1966. This application Apr. 11, 1969, Ser. No. 815,473
Int. Cl. A61c 5/08
U.S. Cl. 32—13                        3 Claims

ABSTRACT OF THE DISCLOSURE

A dental procedure for attaching a tooth crown to the natural root of a tooth utilizes a post having a threaded shank carrying an enlarged head of a material that can be easily ground to alter its shape while the post is situated in the patient's mouth. A hole is drilled in the tooth root and a seat is formed around the hole by counterboring. The hole is tapped to form threads which mate with the threads on the shank of the post. The threaded post is screwed into the hole until the head rests upon the seat. The head is then ground, in situ, to a shape suitable for the acceptance of a jacket crown. The surface of the tooth root is made undulant. An artificial jacket crown, closely fitting upon the shaped head, is then secured by a thin film of dental cement to the head and the crown is thereby held engaged with the undulant surface in a manner resisting rotational forces on the crown.

---

Figure 1:
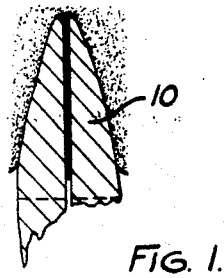

This application is a continuation-in-part of my copending patent application Ser. No. 583,203 which was filed in the U.S. Patent Office on Sept. 30, 1966.

This invention relates to a method of attaching a tooth crown to a tooth root. Usually the tooth crown will be a replacement crown of a material other than the natural material of a tooth, but in some instances it may in fact be possible to use the method to re-attach the broken off natural tooth crown portion.

In my copending application Ser. No. 583,203, I have described a method of attaching a tooth crown to a natural tooth root and the entire exposition of my method set forth in that copending application is here incorporated by reference. The present disclosure is concerned with an improvement upon that method which permits the tooth crown to be more precisely and securely fitted to the root.

According to this invention a method of attaching a tooth crown to a tooth root comprises drilling a hole in the tooth root, forming a seat on the end of the tooth root surrounding the drilled hole, tapping the drilled hole to produce a thread therein, screwing into such tapped hole a tooth post having a threaded rod and a head thereon which head bears on said previously formed seat, making an impression of the head projecting from the root, and also the surrounding root, making a tooth crown from such impression, and cementing such crown onto the head projecting from the root.

The drilled hole may be tapped either before or after formation of the seat, and the seat is preferably formed with a facing tool which has an annular cutter surrounding a locating projection, such that the projection locates in the drilled hole, whilst the annular cutter machines the seat for the post head.

In fitting the post into the tooth, if the length of the rod proves to be too long for the tapped hole, then the rod is shortened by cutting a portion therefrom by means of a diamond disc.

It is preferred that the rod be dipped into cement before it is screwed fully home into the tooth root. The head may be provided with a slot for engagement by a screw driver for the purpose of screwing same into the root.

Prior to the taking of an impression of the head, it is preferred that the head be ground to a suitable tongue shape consistent with the shape of the tooth crown to be attached thereto, which shape, of course, is adapted to the shape of the patient's surrounding teeth.

The head may be ground to this shape whilst the post is out of the tooth root but as the threads are cemented into the tooth root it is of course preferred that the grinding should take place whilst the post is in position in the tooth root.

When the post is first positioned in the tooth root, it is made up therefore of a threaded shank and a head which is preferably of easily ground material and the head is of constant, preferably circular cross-section.

An embodiment of the method according to this invention will now be described by way of example, with reference to the accompanying drawings, wherein the 12 figures show the steps involved in attaching a tooth crown to a tooth root.

Figure 2:
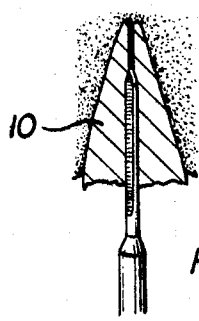
Figure 3:
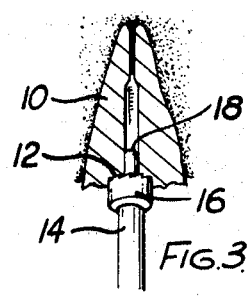

Referring firstly to FIG. 1, there is shown a tooth root 10 from which the crown has broken off or decayed. In the first stage of the method, the end of the tooth root is squared off as shown in dotted lines in FIG. 1. The tooth end is squared off using known dental techniques. In the next stage, FIG. 2, a root reamer is used to drill out the root canal to the desired depth. In this step, care should be taken to ensure that the reamer does not execute eccentric movements. After the drilling out, the next step, as shown in FIG. 3, is the formation of a seat 12 on the end face of the root and surrounding the drilled hole. In this example, the seat is formed by means of a forming tool 14 which has an annular cutter 16 and a locating projection 18. In this step locating projection 18 locates in the drilled hole in the root, whilst the cutter 16, by virtue of rotation of tool 14, counterbores the drilled hole and forms the seat 12.

Figure 4:
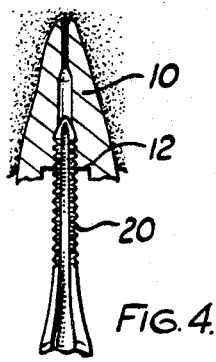

The drilled hole is now provided with a thread by means of a tapping tool 20, as shown clearly in FIG. 4. Established hole tapping techniques are used, and because of the fragile nature of human teeth, care should be taken to exercise only a slight hand pressure during this step.

Figure 5:
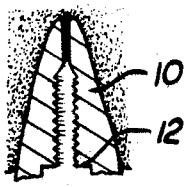

As shown in FIG. 5, the tooth root is now ready to receive the tooth post which is used in the attachment of the tooth crown.

Figure 6:
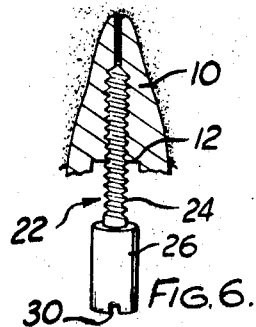
Figure 7:
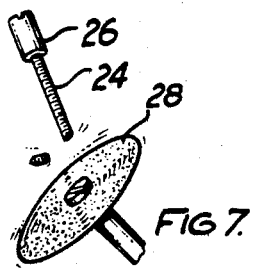
Figure 8:
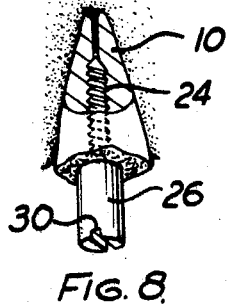

The post 22, as shown in FIG. 6, comprises a threaded shank 24, which is preferably of stainless steel, and a constant cross-section, cylindrical head 26, which has the same dimension as the seat 12 formed in step 3 of the method. If the shank 24 is too long in that the head 26 does not engage in seat 12, then the shank is cut to the desired length by means preferably of a diamond disc 28, as shown in FIG. 7. When the shank 24 has been cut to the desired length it is dipped in dental cement and is then screwed fully home into the threaded bore in the root 10, as shown in FIG. 8. In this position head 26 seats on seat 12 and it will be noted that the head 26 is provided with a screw-driver slot 30 to enable the post to be screwed into the tooth root.

Figure 9:
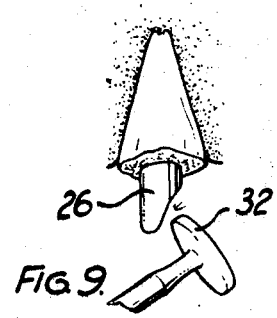

After the cement on the threaded shank has set and the post is firmly anchored in the root, the head 26 is ground to the desired shape by means of the tool 32, as indicated in FIG. 9. This desired shape is such as to conform with the shape of the crown to be attached and is also consistent with the shape of the other teeth in the patient's mouth, particularly the teeth adjacent and opposite the tooth which is being repaired according to the method of the invention.

Figure 10:
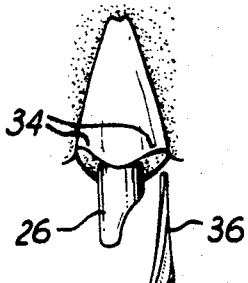

When the head 26 has been ground to the final shape, the labial and palatal portions of the tooth root are made deeper than the mesial and distal portions of the root as shown at 34 in FIG. 10, using the drill 36, also indicated in this figure. The removal of these portions of the tooth is to ensure that rotational forces on the tooth crown which is eventually placed thereon are resisted by the mesial and distal portions of the tooth root.

Figure 11:
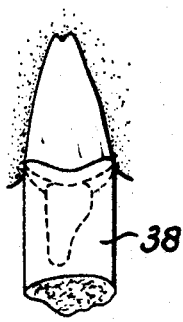
Figure 12:
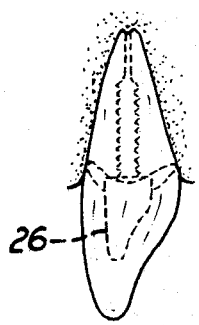

In the next stage, an impression of the ground head and surrounding end face of the tooth root is taken as illustrated at 38 in FIG. 11 (known dental techniques are used in this step) and a replacement crown is formed from such impression and is eventually cemented, using suitable dental cement to the head 26 of the post as illustrated in FIG. 12.

As stated previously, it is preferred that the head of the post 22 should be of a material which can be easily ground away; such material may for example, be brass or plastics material, and the head can be either cemented on the rod, formed thereon, or otherwise secured, such as by processing the head onto the rod.

Obviously the cross-sectional shape of the head may be other than circular. For example, it may be hexagonal or square if desired.

The replacement crown may be of any known material used for this purpose, such as porcelain or gold.

What I claim is:

1. A method for attaching a tooth crown to a natural tooth root by means of a post having a threaded shank carrying an enlarged head, the method comprising the steps of
   (a) drilling and tapping a hole in the tooth root to receive the threaded shank of the post;
   (b) screwing the post into the tooth root to cause the threaded shank to be firmly engaged in the tapped hole with the head of the post exposed;
   (c) while the post is secured to the tooth root, grinding the exposed head to a shape suited to the acceptance of a jacket crown;
   (d) shaping the tooth root to form an undulant surface; and
   (e) securing to the head a tooth crown which forms a jacket about the exposed head and engages the undulant tooth root surface to resist rotational forces exerted on the crown.

2. The method according to claim 1, further including the step of
   counterboring the drilled hole in the tooth root to form on the tooth root a seat upon which the enlarged head bears when the post is fully screwed into the tooth root.

3. The method according to claim 1, further including the step of
   coating the threaded shank with dental cement prior to screwing the post into the tooth root.

References Cited

UNITED STATES PATENTS

| | | | |
|---|---|---|---|
| 1,218,289 | 3/1917 | Maker | 32—13 |
| 1,397,067 | 11/1921 | Williams | 32—13 |
| 2,705,837 | 4/1955 | Gerlach | 32—13 |

ROBERT PESHOCK, Primary Examiner

Disclaimer 3,524,255.—*Peter F. Kurer,* Manchester, Lancashire, England. METHOD OF ATTACHING A TOOTH CROWN TO A TOOTH ROOT. Patent dated Aug. 18, 1970. Disclaimer filed Aug. 14, 1978, by the inventor.

Hereby enters this disclaimer to claims 2 and 3 of said patent.

[*Official Gazette September 14, 1982.*]